US012657808B2

(12) United States Patent
Park

(10) Patent No.: US 12,657,808 B2
(45) Date of Patent: Jun. 16, 2026

(54) VISUAL ATTENTION-BASED RAY TRACING METHOD AND DEVICE FOR FOVEATED RENDERING

(71) Applicant: SiliconArts Technology US Inc., Waco, TX (US)

(72) Inventor: Woo Chan Park, Seoul (KR)

(73) Assignee: SiliconArts Technology US Inc.

( * ) Notice: Subject to any disclaimer, the term of this patent is extended or adjusted under 35 U.S.C. 154(b) by 177 days.

(21) Appl. No.: 18/267,344

(22) PCT Filed: Nov. 2, 2021

(86) PCT No.: PCT/KR2021/015707
§ 371 (c)(1),
(2) Date: Jun. 14, 2023

(87) PCT Pub. No.: WO2022/131532
PCT Pub. Date: Jun. 23, 2022

(65) Prior Publication Data
US 2024/0046548 A1 Feb. 8, 2024

(30) Foreign Application Priority Data

Dec. 15, 2020 (KR) ........................ 10-2020-0175080

(51) Int. Cl.
*G06T 7/70* (2017.01)
*G06T 1/20* (2006.01)
(Continued)

(52) U.S. Cl.
CPC ................ *G06T 15/06* (2013.01); *G06T 7/70* (2017.01); *G06T 7/90* (2017.01); *G06T 2207/10024* (2013.01)

(58) Field of Classification Search
CPC .. G06T 15/06; G06T 7/70; G06T 7/90; G06T 2207/10024; G06T 5/20; G06T 5/70;
(Continued)

(56) References Cited

U.S. PATENT DOCUMENTS

2004/0125103 A1* 7/2004 Kaufman ................ G06T 15/08
345/419
2007/0206008 A1* 9/2007 Kaufman ................ G06T 15/06
345/427
(Continued)

FOREIGN PATENT DOCUMENTS

KR 10-2010-0128881 A 12/2010
KR 10-2012-0092926 A 8/2012
(Continued)

OTHER PUBLICATIONS

International Search Report for PCT/KR2021/015707 mailed Mar. 21, 2022 from Korean Intellectual Property Office.
Korean Office Action for related KR Application No. 10-2020-0175080 mailed Dec. 20, 2022 from Korean Intellectual Property Office.

*Primary Examiner* — Wesner Sajous
(74) *Attorney, Agent, or Firm* — BROADVIEW IP LAW, PC

(57) ABSTRACT

A visual attention-based ray tracing method includes: determining a central position of a specific scene during generation of a first image by rendering the specific scene at a first resolution; and performing selective rendering repeatedly on candidate pixels existing between sampling pixels through adaptive adjusting of a threshold due to a distance from the central position during generation of a second image by rendering the first image at a second resolution higher than the first resolution.

11 Claims, 8 Drawing Sheets

600

(51) Int. Cl.

| | | |
|---|---|---|
| *G06T 5/20* | (2006.01) | |
| *G06T 7/90* | (2017.01) | |
| *G06T 15/06* | (2011.01) | |

(58) Field of Classification Search

CPC .. G06T 3/407; G06T 3/40; G06T 1/20; G06T 11/001; G06T 15/20; G06T 15/206; G06T 15/005; G06T 15/04; G06T 15/50; G06T 15/506; G06F 3/011; G06F 3/14; G06F 3/013; G06F 7/544; G09G 5/02; G09G 5/363; G09G 5/14; G09G 2340/0407; G09G 2354/00; H04N 1/60; H04N 5/57–58; H04N 9/64–77

See application file for complete search history.

(56) References Cited

U.S. PATENT DOCUMENTS

| | | | |
|---|---|---|---|
| 2017/0287446 A1 | 10/2017 | Young et al. | |
| 2019/0391641 A1* | 12/2019 | Vanreenen | ................ G06T 5/20 |
| 2020/0092523 A1* | 3/2020 | Peuhkurinen | ........ H04N 9/3105 |
| 2020/0334891 A1* | 10/2020 | Liu | ........................... G06T 5/70 |
| 2023/0104168 A1* | 4/2023 | Altal | ........................ G06T 3/40 |
| | | | 351/209 |

FOREIGN PATENT DOCUMENTS

| | | | | |
|---|---|---|---|---|
| KR | 10-2015-0039493 A | | 4/2015 | |
| KR | 101869912 B1 * | 6/2018 | ............. | G06T 15/06 |

* cited by examiner

FIG. 2

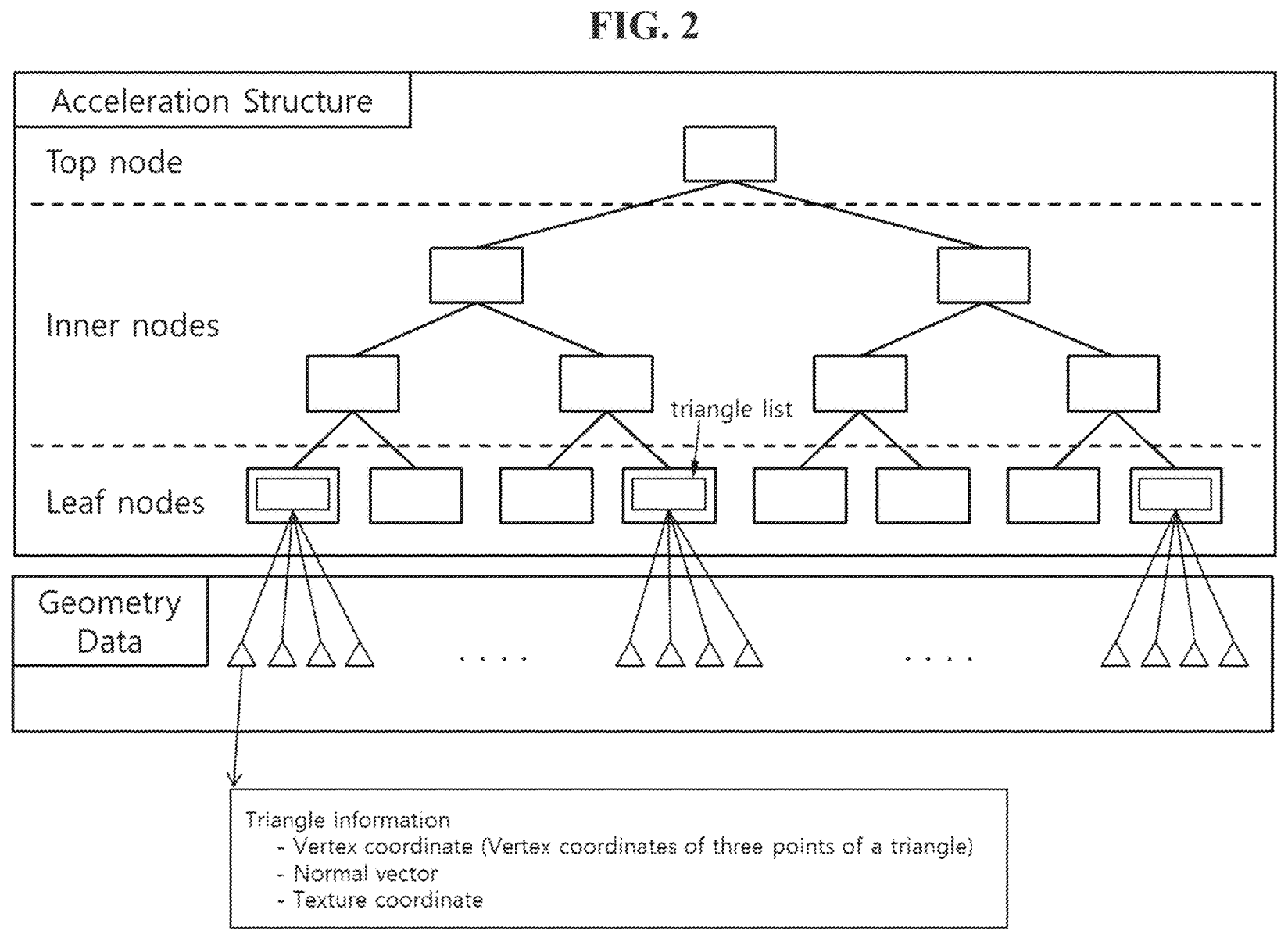

Acceleration Structure

Top node

Inner nodes

Leaf nodes triangle list

Geometry Data

Triangle information
- Vertex coordinate (Vertex coordinates of three points of a triangle)
- Normal vector
- Texture coordinate

VISUAL ATTENTION-BASED RAY TRACING METHOD AND DEVICE FOR FOVEATED RENDERING

CROSS-REFERENCE TO PRIOR APPLICATIONS

This application is a National Stage Patent Application of PCT International Application No. PCT/KR2021/015707 (filed on Nov. 2, 2021), which claims priority to Korean Patent Application No. 10-2020-0175080 (filed on Dec. 15, 2020), which are all hereby incorporated by reference in their entirety.

BACKGROUND

The present disclosure relates to a three-dimensional (3D) graphics processing technology. More particularly, the present disclosure relates to a visual attention-based ray tracing method and device for foveated rendering capable of performing rendering adaptively to a user's visual attention. 3D graphics technology is a branch of graphics technology that uses a 3D representation of geometric data stored in a computing device and is widely used today in various industries, including media and game industries. In general, 3D graphics technology requires a separate high-performance graphics processor due to a large amount of computation.

Along with advances in the processors, research has been underway to develop ray tracing technology that may generate photo-realistic 3D graphics.

Ray tracing technology relates to a rendering method based on global illumination. Ray tracing technology generates realistic 3D images by providing reflection, refraction, and shadow effects in a natural manner by simulating the effect of light reflected or refracted from another object on the image of a target object.

PRIOR ART REFERENCES

Patents

Korea laid-open patent 10-2015-0039493 (2015 Apr. 10)

SUMMARY

An object according to one embodiment of the present disclosure is to provide a visual attention-based ray tracing method and device for foveated rendering capable of performing rendering adaptively to the area where a user's visual attention is high.

Another object according to one embodiment of the present disclosure is to provide a visual attention-based ray tracing method and device for foveated rendering capable of adaptively adjusting a threshold for selective rendering according to a distance from a central position of a specific scene.

A visual attention-based ray tracing method for foveated rendering according to the embodiments comprises determining a central position of a specific scene during generation of a first image by rendering the specific scene at a first resolution; and performing selective rendering repeatedly on candidate pixels existing between sampling pixels through adaptive adjusting of a threshold due to a distance from the central position during generation of a second image by rendering the first image at a second resolution higher than the first resolution.

The determining of the central position may include determining the central position of a dynamic scene constituting the specific scene based on the positions of objects.

The determining of the central position may include calculating the amount of position change of each of the objects from dynamic scenes of previous and current frames; and determining the central position based on the position of a main object exhibiting the largest position change.

The performing repeatedly may include reducing a reference threshold when the distance is smaller than a preset reference distance and increasing the reference threshold when the distance is larger than the reference distance.

The performing repeatedly may include adjusting a reference distance according to the size of the main object when the central position is determined based on the main object's position; and reducing a reference threshold when the distance is smaller than the adjusted reference distance and increasing the reference threshold when the distance is larger than the adjusted reference distance.

The performing repeatedly may include determining a decrement or an increment for the reference threshold according to a difference between the distance and the reference distance.

The performing repeatedly may include applying an interpolation algorithm when a color difference between adjacent sampling pixels on both sides of a specific candidate pixel in the vertical or horizontal direction is smaller than an adjusted threshold and determining a color for the specific candidate pixel by performing ray tracing when the color difference is larger than the adjusted threshold.

The performing repeatedly may include providing the second image as a rendering result for the specific scene when the selective rendering is completed for all the candidate pixels.

A visual attention-based ray tracing device for foveated rendering according to embodiments comprises a first rendering unit determining a central position of a specific scene during generation of a first image by rendering the specific scene at a first resolution; and a second rendering unit performing selective rendering repeatedly on candidate pixels existing between sampling pixels through adaptive adjusting of a threshold due to a distance from the central position during generation of a second image by rendering the first image at a second resolution higher than the first resolution.

The second rendering unit may include a candidate pixel extraction module determining candidate pixels existing between sampling pixels of the first image; a distance calculation module calculating a distance from the central position for a specific candidate pixel; a threshold adjustment module adjusting a reference threshold adaptively by comparing the distance with a preset reference distance; and a rendering module determining a color of the specific candidate pixel by performing the selective rendering according to the adjusted reference threshold.

The threshold adjustment module may reduce a reference threshold when the distance is smaller than a preset reference distance and increase the reference threshold when the distance is larger than the reference distance.

The threshold adjustment module may determine a decrement or an increment for the reference threshold according to a difference between the distance and the reference distance.

The present disclosure may provide the following effects. However, since it is not meant that a specific embodiment has to provide all of or only the following effects, the technical scope of the present disclosure should not be regarded as being limited by the specific embodiment.

A visual attention-based ray tracing method and device for foveated rendering according to one embodiment of the present disclosure may perform rendering adaptively to the area where a user's visual attention is high.

A visual attention-based ray tracing method and device for foveated rendering according to one embodiment of the present disclosure may adaptively adjust a threshold for selective rendering according to a distance from a central position of a specific scene.

BRIEF DESCRIPTION OF THE DRAWINGS

FIG. 2 shows one embodiment of a KD tree as an acceleration structure used in a ray tracing process.

FIG. 3 illustrates a processing order of a ray tracing process.

DETAILED DESCRIPTION

Figure 1:
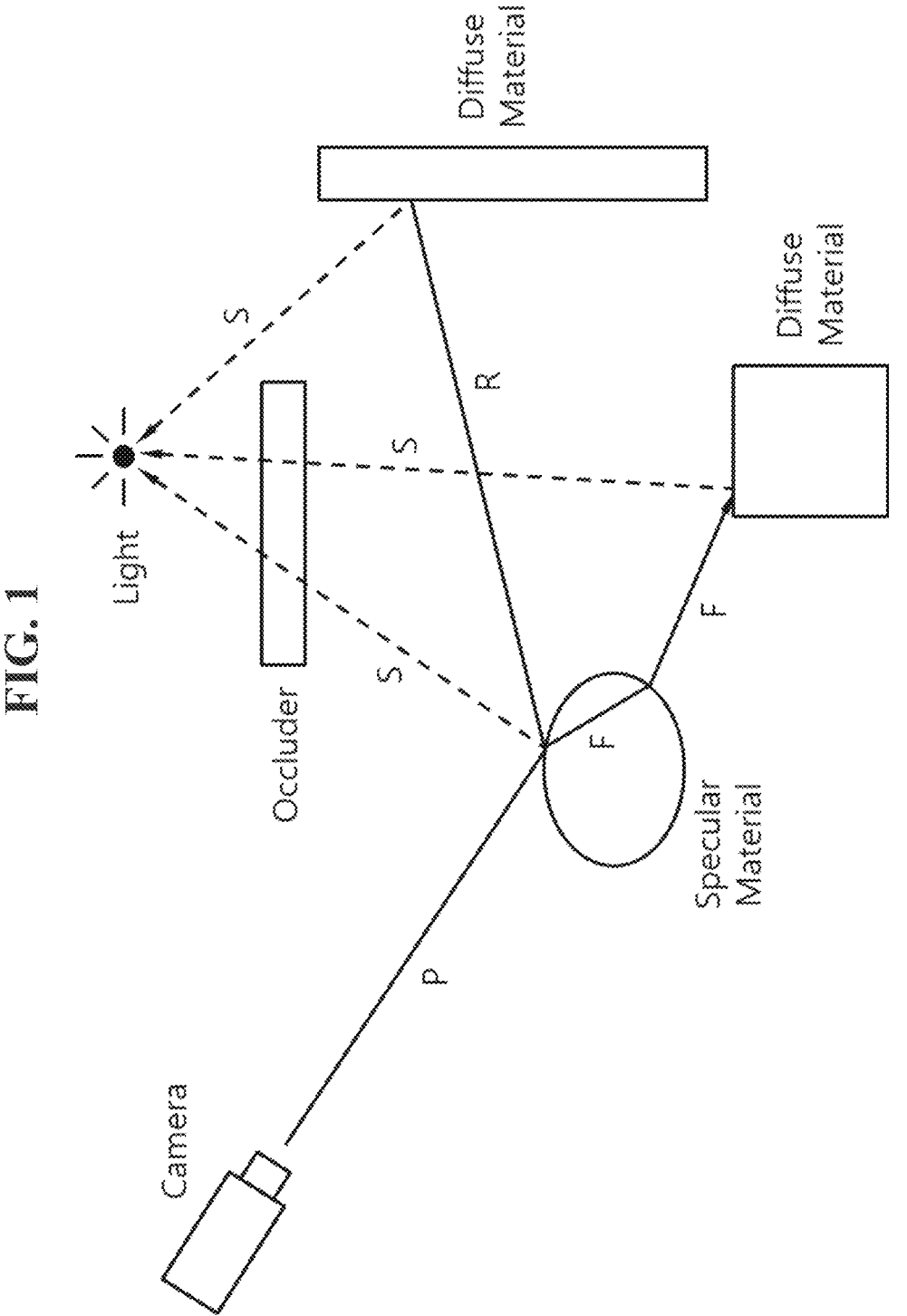
FIG. 1 shows one embodiment of a ray tracing process.

Since the description of the present disclosure is merely an embodiment for structural or functional explanation, the scope of the present disclosure should not be construed as being limited by the embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Meanwhile, other expressions describing a relationship between components, that is, "between," "directly between," "neighboring to," "directly neighboring to," and the like, should be similarly interpreted.

It should be understood that the singular expression includes the plural expression unless the context clearly indicates otherwise, and it will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Identification symbols (for example, a, b, and c) for individual steps are used for the convenience of description. The identification symbols are not intended to describe an operation order of the steps. Therefore, unless otherwise explicitly indicated in the context of the description, the steps may be executed differently from the stated order. In other words, the respective steps may be performed in the same order as stated in the description, actually performed simultaneously, or performed in reverse order.

The present disclosure may be implemented in the form of program code in a computer-readable recording medium. A computer-readable recording medium includes all kinds of recording devices storing data that a computer system may read. Examples of a computer-readable recording medium include a ROM, a RAM, a CD-ROM, a magnetic tape, a floppy disk, and an optical data storage device. Also, the computer-readable recording medium may be distributed over computer systems connected through a network so that computer-readable code may be stored and executed in a distributed manner.

Unless defined otherwise, all the terms used in the present disclosure provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

FIG. 1 shows one embodiment of a ray tracing process.

Referring to FIG. 1, a ray tracing method performed in a ray tracing device may correspond to a rendering method according to global illumination. The use of global illumination-based rendering may imply that light reflected or refracted from other objects also affects the image of a target object. As a result, realistic 3D images may be generated since reflection, refraction, and shadow effects are realized in a natural manner.

The ray tracing device may first generate a primary ray P from a camera position per pixel and perform calculations to find an object that intersects the ray. The ray tracing device may generate a reflection ray R for a reflection effect or a refraction ray F for a refraction effect at the intersection point where the ray and the object meet if the object hit by the ray has a reflection or refraction property; for a shadow effect, the ray tracing device may generate a shadow ray S in the direction of light.

Here, if the shadow ray directed to the corresponding light and an object meet, a shadow is created; otherwise, no shadow is created. The reflected ray and the refracted ray are called secondary rays, and the ray tracing device may perform calculations for each ray to find an object that intersects the ray. The ray tracing device may perform the above process recursively.

FIG. 2 shows one embodiment of a KD tree as an acceleration structure used in a ray tracing process.

Referring to FIG. 2, to perform ray tracing, an acceleration structure (AS), such as a KD tree or a Bounding Volume Hierarchy (BVH), generated based on the entire geometry data (consisting of the coordinates of triangles) is essential. Therefore, it is necessary to build an AS before performing ray tracing. Since building such an acceleration structure requires a lot of computation, it may take considerable time.

FIG. 2 illustrates the overall structure of a KD tree. The KD tree may correspond to a binary tree having a hierarchical structure for a partitioned space. A KD tree may consist of inner nodes (including the top node) and leaf nodes, and a leaf node may correspond to a space containing objects that intersect with the corresponding node. In other words, the KD tree is a spatial partitioning tree and may correspond to one of the spatial partitioning structures.

On the other hand, an inner node may occupy a bounding box-based spatial area, and the corresponding spatial area may be split into two areas and assigned to two lower nodes. As a result, an inner node may consist of a splitting plane and a sub-tree of two areas partitioned by the splitting plane, and a leaf node may contain only a series of triangles. For example, a leaf node may include a triangle list for pointing to at least one triangle information included in geometric data; the triangle information may include vertex coordinates for three points of the triangle, normal vectors, and/or texture coordinates. If triangle information in the geometric data is implemented as an array, the triangle list in a leaf node may correspond to the array index.

On the other hand, the space-partitioning position p may correspond to the point where the cost (the number of node visits, the number of times for calculating whether a ray intersects a triangle, and so on) to find a triangle that hits an arbitrary ray is minimized; the most popular method used to find the corresponding position p may be the surface area heuristic (SAH).

Figure 3:
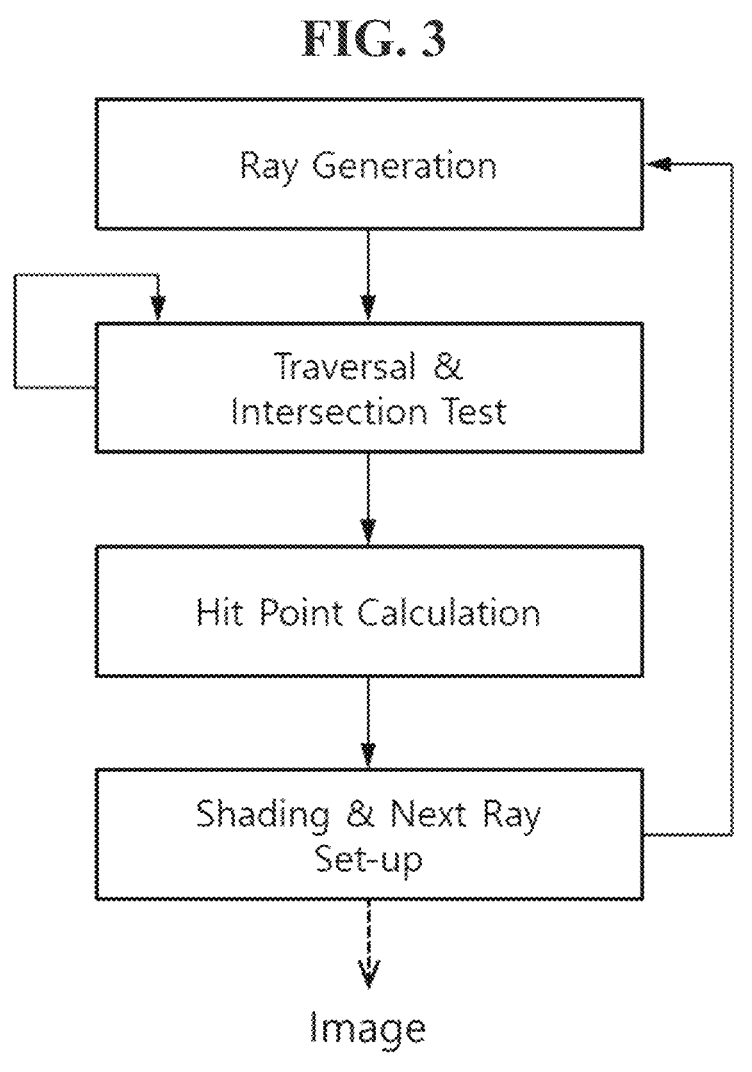

FIG. 3 illustrates a processing order of a ray tracing process.

Referring to FIG. 3, a ray tracing process may largely include a ray generation step, a traversal & intersection test step, a hit point calculation step, and a shading & next ray set-up step.

First, the ray generation step may generate a primary ray from a viewpoint position for each pixel. Next, the ray generation step may search the acceleration structure (AS), such as a kd-tree and a bounding volume hierarchy (BVH), to find a leaf node intersecting the ray. Here, the leaf node stores information on triangles.

Next, the traversal & intersection test step may test all triangles belonging to the intersecting leaf node to determine whether the triangle meets the ray. The process may be repeated until a triangle that meets the ray is found. Afterward, the hit point calculation step may calculate a hit point for a triangle that meets the ray.

Next, the shading step may calculate the color value at the ray-triangle hit point. If the generation of shadow rays due to lighting or the generation of secondary rays due to the material of a hit triangle is required, the information related to the generation may be determined in the next ray set-up step and may be transmitted to the ray generation step. The ray generation step may generate shadow rays and secondary rays based on the information.

Figure 4:
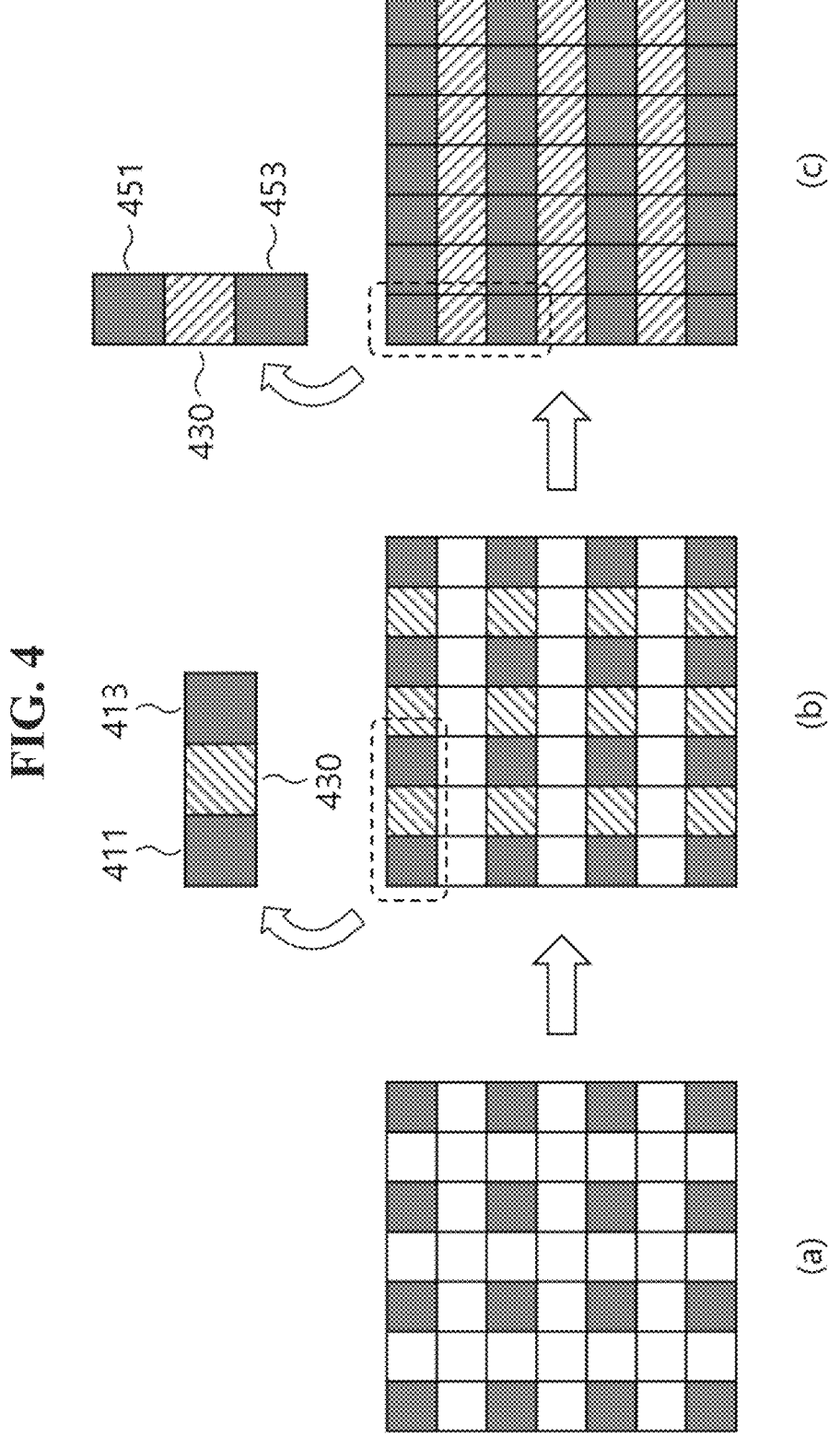
FIG. 4 illustrates an operational process of selective rendering.

FIG. 4 illustrates an operational process of selective rendering.

Referring to FIG. 4, rendering typically performs sampling on the entire pixels; if the number of pixels is smaller than the number of samples, unsampled pixels may be generated by interpolating adjacent pixel values.

First, sampling may be performed by skipping every other x- and y-coordinate. This sampling may yield the same result obtained by rendering at a low resolution. As a result, rendering is performed on the pixels of grey color in FIG. 4(a) to generate pixels at the corresponding positions while unrendered pixels remain white. As shown in FIG. 4(b), for an unrendered pixel 430, interpolation is applied using horizontal pixel values 411, 413 on the same row to generate a pixel at the corresponding position.

After the step of FIG. 4(b) is completed, as shown in the step of FIG. 4(c), interpolation is applied for the unrendered pixel 430 using vertical pixel values 451, 453 to generate a pixel at the corresponding position. The embodiment of FIG. 4 assumes that sampling is performed by skipping every other x- and y-coordinate; however, the present disclosure is not necessarily limited to the assumption above, and sampling may be performed by skipping pixels with a larger interval if necessary.

Selective rendering may be performed in a manner of determining whether to perform interpolation or sampling on a unsampled portion according to a color difference threshold. For example, assuming that the threshold is set to 16, interpolation may be performed if the color difference between sampled neighboring pixels is 16 or less, and sampling may be performed if the color difference exceeds 16. Therefore, if a threshold applied to selective rendering is increased, rendering performance may increase, but image quality may decrease. By adjusting the threshold in this way, rendering performance and image quality may be adaptively selected.

Figure 5:
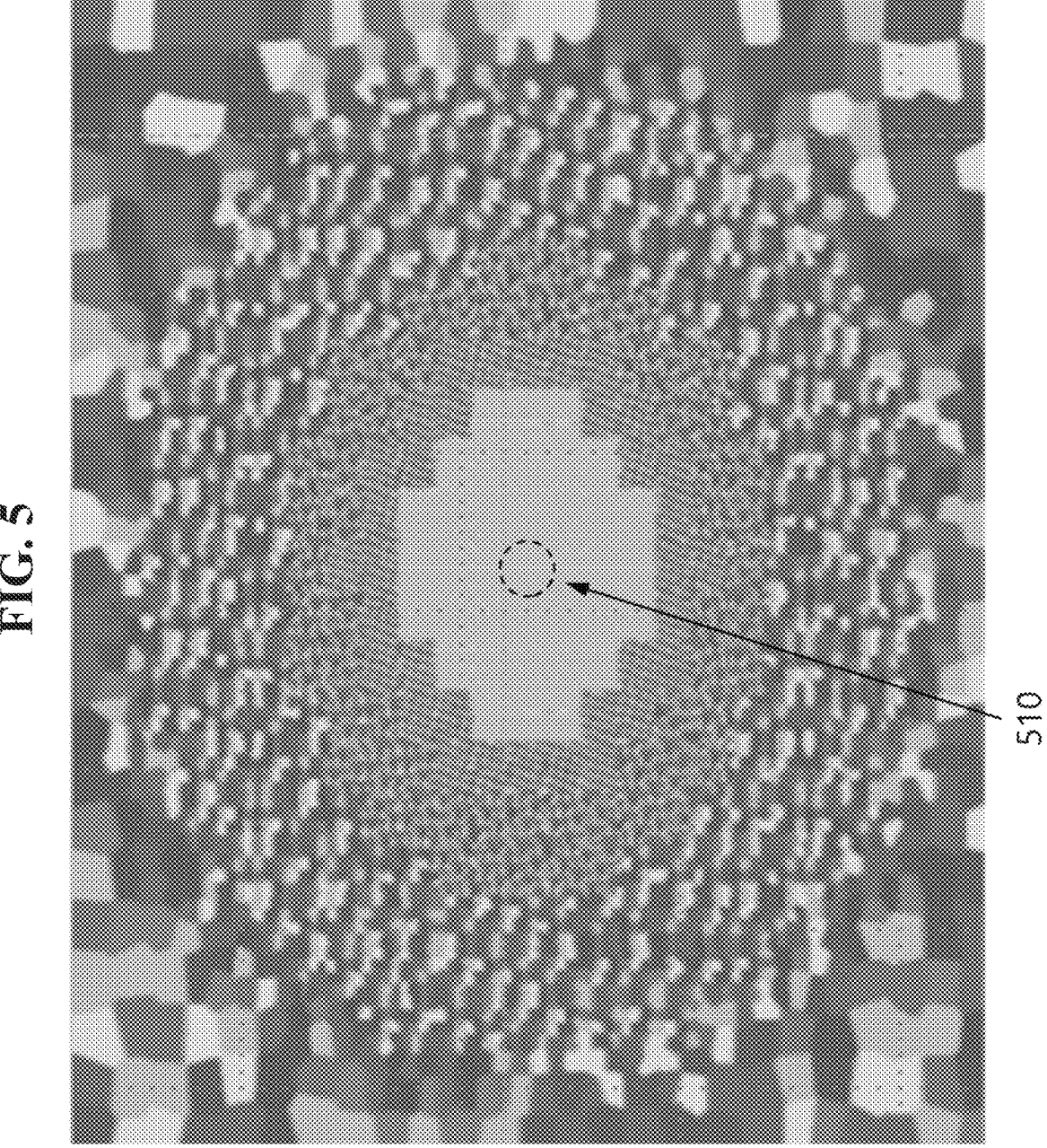
FIG. 5 illustrates the operation of foveated rendering.

FIG. 5 illustrates the operation of foveated rendering.

Referring to FIG. 5, foveated rendering is a technique of adaptively rendering the image quality of the central area and areas other than the central area by reflecting the human visual recognition system. Suppose rendering is applied to generate a high-quality image in the central area of a screen (or viewpoint) and a low-quality image in the peripheral area. In that case, rendering speed may be increased while preventing deterioration of image quality.

Existing foveated rendering techniques are based on rasterization; after being rendered to have multiple levels of quality from the center of the user's viewpoint, a viewport is transformed into a circular form to match the human visual recognition system and then blended to generate a final image. In the foveated rendering method above, some rendering pixels may be discarded while a rectangular viewport is transformed into a circular one.

On the other hand, since the ray tracing scheme may perform rendering in pixel units, the foveated rendering technique may be readily applied to ray tracing. If foveated rendering that reflects the human visual recognition system is applied to ray tracing, the performance of ray tracing may be enhanced while minimizing the penalty related to cognitive factors.

FIG. 5 may show an area calculated by foveated rendering that applies ray tracing. In other words, the central area 510 corresponds to an area in which high-quality images are rendered to the central area of the gaze, and images of lower quality may be rendered toward areas other than the central area of the gaze.

Figure 6:
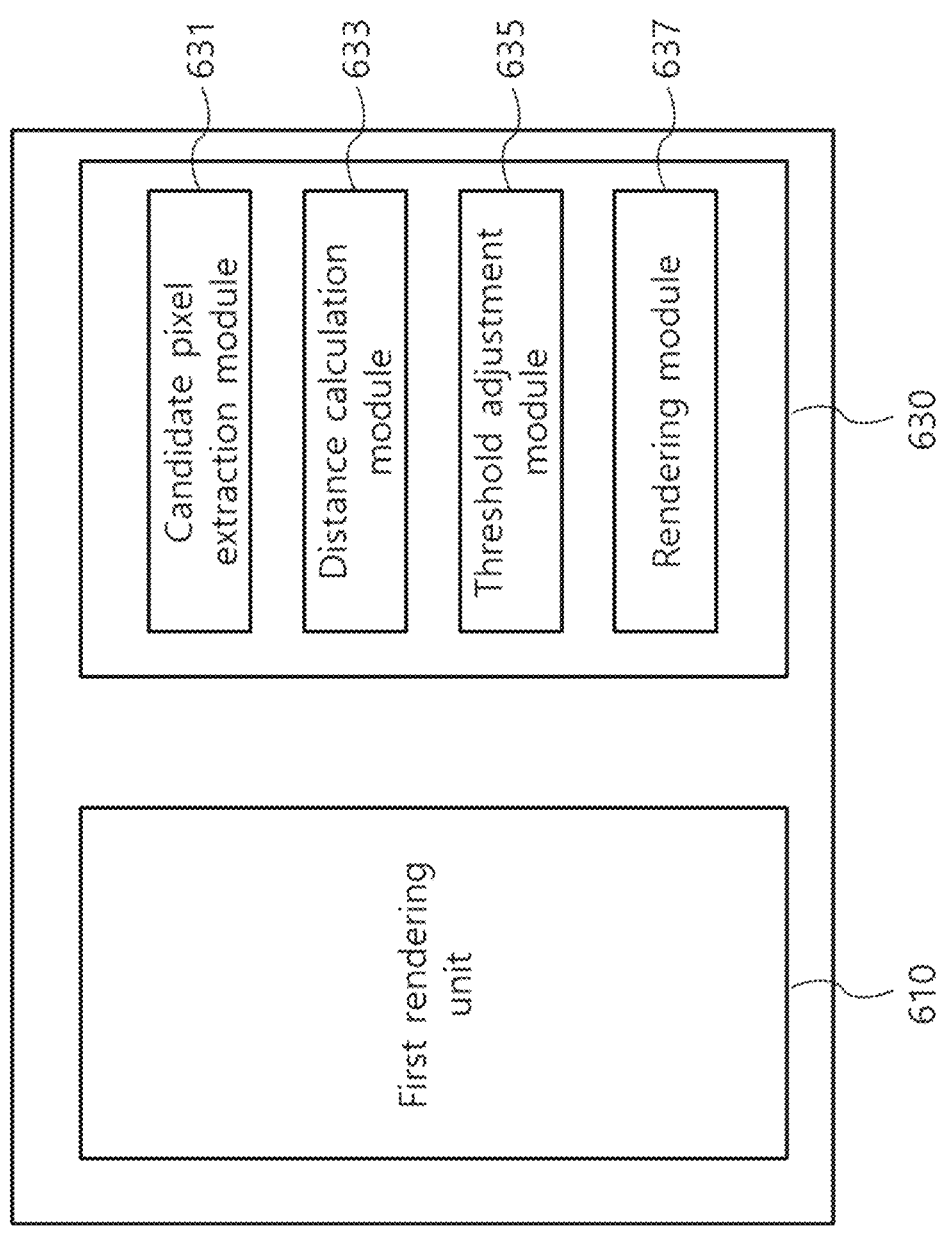
FIG. 6 illustrates a functional structure of a ray tracing device according to the present disclosure.

FIG. 6 illustrates a functional structure of a ray tracing device according to the present disclosure.

Referring to FIG. 6, the ray tracing device 600 may include a first rendering unit 610, a second rendering unit 630, and a controller.

The first rendering unit 610 may generate a first image by rendering a specific scene at a first resolution. At this time, the first resolution may correspond to a relatively low resolution. Accordingly, on average, the rendering speed is made fast, while the image quality of the first image may be low. In other words, the first rendering unit 610 may quickly generate a low-resolution image in the first stage and provide basic information for generating a high-resolution image during the process of generating an image of a specific scene. In one embodiment, the first rendering unit 610 may collect information on the center position of a specific scene for each frame during the rendering process. Typically, the center position of a frame, namely, coordinates of the center point of a specific scene, may be determined to be the center position; however, the present disclosure is not necessarily limited to the specific example.

In one embodiment, the first rendering unit 610 may determine the center position based on the positions of objects in a dynamic scene constituting a specific scene. In other words, the user's gaze may focus more on a dynamic scene than on a static scene and may change according to the movement of an object included in the dynamic scene. Accordingly, the first rendering unit 610 may determine an area in which the user's visual attention is high as the central area in consideration of the positions of objects in the dynamic scene.

In one embodiment, the first rendering unit 610 may calculate the amount of position change of each object in the dynamic scenes of previous and current frames and determine the central position based on the position of a main object exhibiting the largest position change. In other words, the main object may correspond to an object exhibiting the largest position change among objects included in a dynamic scene. The first rendering unit 610 may determine the central position based on the position of an object showing the largest movement, considering that the user's visual attention is high on the object showing the largest movement along with frame progression. Also, when the amounts of position change of objects within a dynamic scene are similar within a predetermined range or the same, the first rendering unit 610 may determine the central position based on the position of the largest object among objects.

The second rendering unit 630 may generate a second image by rendering the first image at a second resolution. In this case, the second resolution may correspond to a relatively high resolution; accordingly, the second resolution may be higher than the first resolution. For example, the second rendering unit 630 may generate a high-resolution second image as a rendering result by up-sampling the first image. Also, in the process of generating the second image, the second rendering unit 630 may perform rendering of the second image by repeatedly performing selective rendering on the candidate pixels between sampling pixels of the first image through adaptive threshold adjustment according to a distance from the center position.

In one embodiment, the second rendering unit 630 may reduce the reference threshold when the distance from the center position is smaller than a preset reference distance for each candidate pixel and increase the reference threshold when the corresponding distance is greater than the reference distance. Here, the reference threshold may be used as a selection criterion in the process of selectively determining whether to determine color through selective rendering, namely, interpolation or ray tracing. In other words, the second rendering unit 630 may perform rendering adaptive to visual attention by using the information on the proximity to the center or the periphery.

In one embodiment, the second rendering unit 630 may adjust the reference distance according to the size of a main object when the central area is determined based on the position of the main object. In other words, as the size of an object increases, the size of the central area recognized by the user tends to increase; thus, the reference distance may be adaptively adjusted according to the object's size. Afterward, the second rendering unit 630 may decrease the reference threshold when the distance from the central position is smaller than the adjusted reference distance and increase the reference threshold when the distance is greater than the adjusted reference distance.

In one embodiment, the second rendering unit 630 may determine a decrement or an increment of the reference threshold according to the difference between the distance from the central position and the reference distance. In other words, the second rendering unit 630 may gradually increase the adjustment ratio of the reference threshold as the difference due to the comparison result increases. Meanwhile, the second rendering unit 630 may determine an adjustment size of the reference threshold in proportion to the difference due to the comparison result.

In one embodiment, the second rendering unit 630 may determine the color for a specific candidate pixel by applying an interpolation algorithm when a color difference between adjacent sampling pixels on both sides of the specific candidate pixel in a vertical or horizontal direction is smaller than an adjusted threshold. In one embodiment, the second rendering unit 630 may determine the color for a specific candidate pixel by performing ray tracing when a color difference between adjacent sampling pixels on both sides of the specific candidate pixel in a vertical or horizontal direction is greater than the adjusted threshold value.

In other words, selective rendering may improve the overall rendering performance by applying the rendering technique differently according to a comparison result of a color difference between adjacent pixels and a threshold value. In another embodiment, the second rendering unit 630 may perform selective rendering by comparing an average value of a color difference between pixels in a horizontal direction and a color difference between pixels in a vertical direction with a threshold value when adjacent pixels in vertical and horizontal directions are all available for a specific candidate pixel.

In one embodiment, the second rendering unit 630 may provide a second image as a rendering result for a specific scene when selective rendering is completed for all candidate pixels. The second rendering unit 630 may extract candidate pixels requiring rendering to generate a high-resolution second image from the low-resolution first image and repeatedly perform selective rendering on each candidate pixel. As a result, when the selective rendering process is performed for all candidate pixels, the second image may be generated as a result. The second rendering unit 630 may provide the second image as a rendering result for one frame and may repeatedly perform the same process along with frame progression.

In one embodiment, the second rendering unit 630 may include a plurality of modules that independently perform a rendering operation for generating a second image. More specifically, the second rendering unit 630 may include a candidate pixel extraction module 631 determining candidate pixels existing between sampling pixels of the first image; a distance calculation module 633 calculating a distance from the central position for a specific candidate pixel; a threshold adjustment module 635 adjusting a reference threshold adaptively by comparing the corresponding distance with a preset reference distance; and a rendering module 637 determining a color of the specific candidate pixel by performing selective rendering according to the adjusted reference threshold.

The controller may control the overall operation of the ray tracing device 600 and manage a control flow or a data flow between the first rendering unit 610 and the second rendering unit 630.

Figure 7:
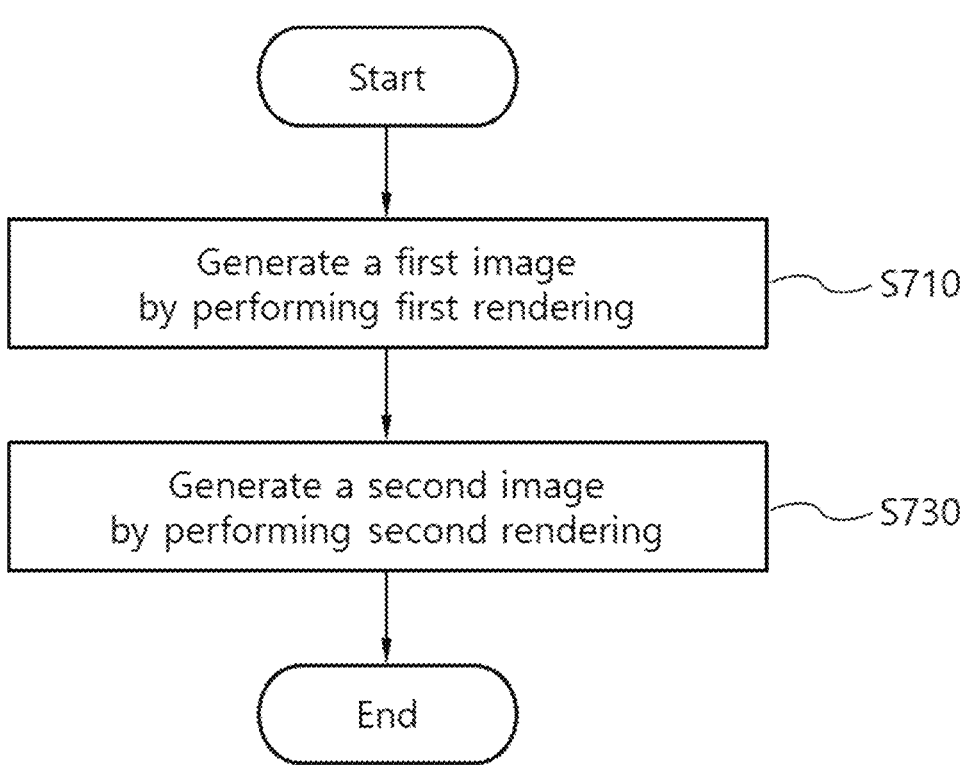
FIG. 7 is a flow diagram illustrating a ray tracing method according to the present disclosure.
Figure 8:
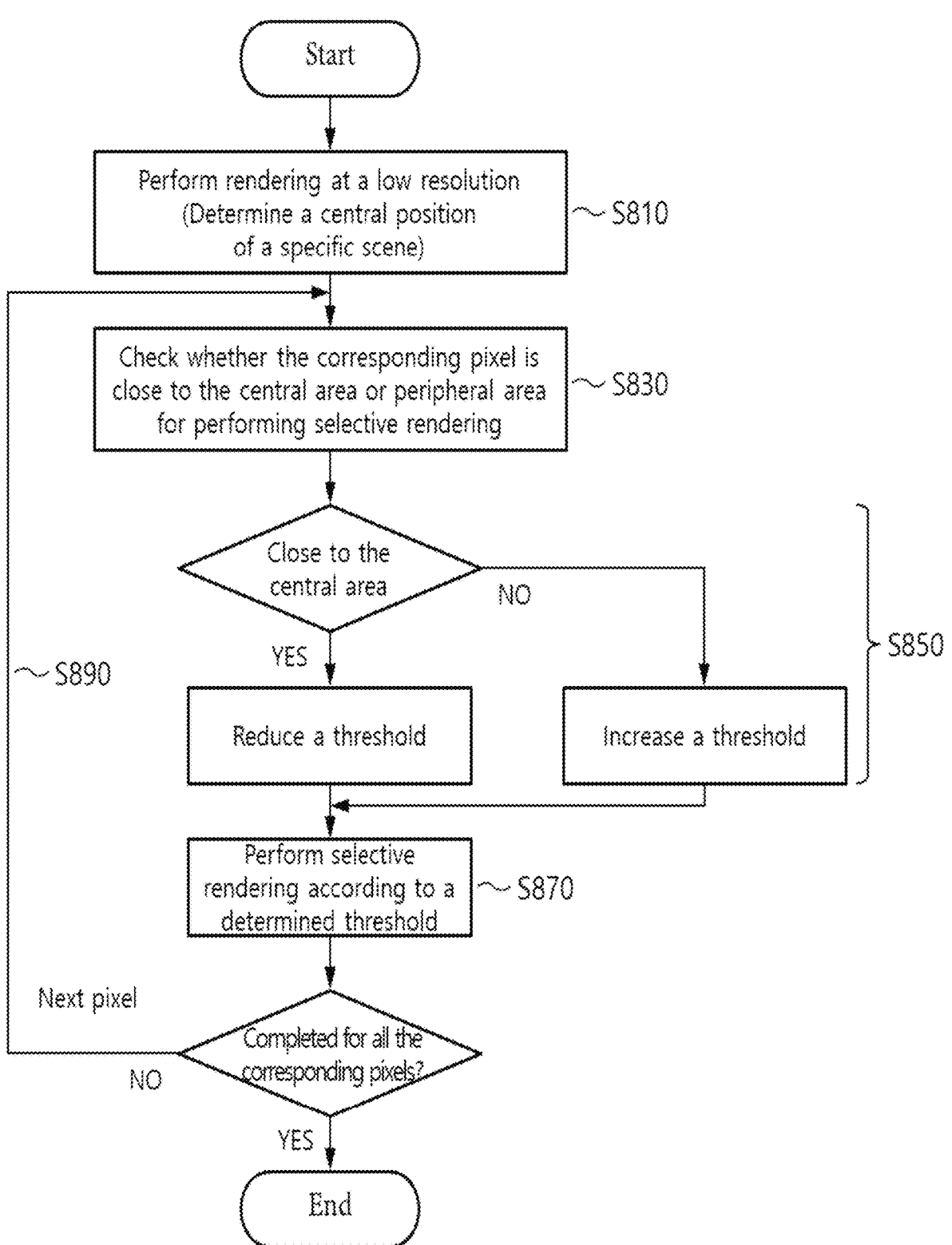
FIG. 8 is a flow diagram illustrating one embodiment of a ray tracing process according to the present disclosure.

FIG. 7 is a flow diagram illustrating a ray tracing method according to the present disclosure, and FIG. 8 is a flow diagram illustrating one embodiment of a ray tracing process according to the present disclosure.

Referring to FIGS. 7 and 8, the ray tracing device 600 may perform rendering at a low resolution through the first rendering unit 610 S710. At this time, the first rendering unit 610 may determine the central position of the corresponding specific scene S810.

Also, the ray tracing device 600 may generate a high-resolution image based on a low-resolution image through the second rendering unit 630 S730. To this end, the second rendering unit 630 may determine unrendered pixels as candidate pixels to generate a second image and repeatedly perform selective rendering for each candidate pixel.

More specifically, referring to FIG. 8, the second rendering unit 630 may check whether the position of a specific pixel is close to the central area or peripheral area to perform selective rendering S830. When the position of the specific pixel is closer to the central area, the threshold for selective rendering may be lowered, while the threshold may be increased in the opposite case S850. The second rendering unit 630 may determine a specific color value by performing selective rendering at the position of the specific pixel based on an adjusted threshold S870. For example, if a color difference between pixels adjacent to the position of the unrendered specific pixel is smaller than the adjusted threshold, the color value may be determined through interpolation, but the color value may be determined through ray tracing in the opposite case.

The second rendering unit 630 may sequentially perform threshold adjustment and selective rendering on one candidate pixel; when rendering of the corresponding candidate pixel is completed, the second rendering unit 630 may repeatedly perform the operation on the next candidate pixel S890. In the process of generating a high-resolution image through up-sampling of a low-resolution image, the second rendering unit 630 may determine a color value for an unrendered pixel through selective rendering and adjust a threshold for selective rendering adaptively according to the degree of visual attention, thereby effectively enhancing the rendering performance while reducing degradation of image quality.

Although the present disclosure has been described with reference to preferred embodiments given above, it should be understood by those skilled in the art that various modifications and variations of the present disclosure may be made without departing from the technical principles and scope specified by the appended claims below.

---

[Descriptions of symbols]

411, 413: Horizontal pixel values
430: Unrendered pixel
451, 453: Vertical pixel values
510: Central area
600: Ray tracing device
610: First rendering unit    630: Second rendering unit
631: Candidate pixel extraction module    633: Distance calculation module
635: Threshold adjustment module    637: Rendering module

---

The invention claimed is:

1. A visual attention-based ray tracing method for foveated rendering, the method comprising:

determining a central position of a specific scene during generation of a first image by rendering the specific scene at a first resolution; and performing selective rendering repeatedly on candidate pixels existing between sampling pixels through adaptive adjusting of a threshold due to a distance from the central position during generation of a second image by rendering the first image at a second resolution higher than the first resolution, wherein performing selective rendering comprises:

determining candidate pixels existing between sampling pixels of the first image, calculating the distance from the central position for a specific candidate pixel, adjusting a reference threshold adaptively by comparing the distance with a preset reference distance, and determining a color of the specific candidate pixel by performing the selective rendering according to the adjusted reference threshold.

2. The method of claim 1, wherein the determining of the central position includes determining the central position of a dynamic scene constituting the specific scene based on the positions of objects.

3. The method of claim 2, wherein the determining of the central position includes:

calculating the amount of position change of each of the objects from dynamic scenes of previous and current frames; and determining the central position based on the position of a main object exhibiting the largest position change.

4. The method of claim 1, wherein the performing repeatedly includes reducing a reference threshold when the distance is smaller than a preset reference distance and increasing the reference threshold when the distance is larger than the reference distance.

5. The method of claim 3, wherein the performing repeatedly includes:

adjusting a reference distance according to the size of the main object when the central position is determined based on the main object's position; and reducing a reference threshold when the distance is smaller than the adjusted reference distance and increasing the reference threshold when the distance is larger than the adjusted reference distance.

6. The method of claim 4, wherein the performing repeatedly includes determining a decrement or an increment for the reference threshold according to a difference between the distance and the reference distance.

7. The method of claim 1, wherein the performing repeatedly includes applying an interpolation algorithm when a color difference between adjacent sampling pixels on both sides of a specific candidate pixel in the vertical or horizontal direction is smaller than an adjusted threshold and determining a color for the specific candidate pixel by performing ray tracing when the color difference is larger than the adjusted threshold.

8. The method of claim 1, wherein the performing repeatedly includes providing the second image as a rendering result for the specific scene when the selective rendering is completed for all the candidate pixels.

9. A visual attention-based ray tracing device for foveated rendering, the device comprising a rendering unit configured to:

determine a central position of a specific scene during generation of a first image by rendering the specific scene at a first resolution;

perform selective rendering repeatedly on candidate pixels existing between sampling pixels through adaptive adjusting of a threshold due to a distance from the central position during generation of a second image by rendering the first image at a second resolution higher than the first resolution;

determine candidate pixels existing between sampling pixels of the first image;

calculate a distance from the central position for a specific candidate pixel;

adjust a reference threshold adaptively by comparing the distance with a preset reference distance; and determine a color of the specific candidate pixel by performing the selective rendering according to the adjusted reference threshold.

10. The device of claim 9, wherein the rendering unit is further configured to reduce a reference threshold when the distance is smaller than a preset reference distance and increases the reference threshold when the distance is larger than the reference distance.

11. The device of claim 10, wherein the rendering unit is further configured to determine a decrement or an increment for the reference threshold according to a difference between the distance and the reference distance.

*    *    *    *    *